(12) United States Patent
Anderson

(10) Patent No.: US 12,710,910 B2
(45) Date of Patent: Aug. 18, 2026

(54) METHODS AND APPARATUS TO MAP MULTI-DISPLAY POSITIONS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/895,740

(22) Filed: Aug. 25, 2022

(65) Prior Publication Data

US 2022/0413788 A1 Dec. 29, 2022

(51) Int. Cl.
*G06F 3/14* (2006.01)
*G02B 5/08* (2006.01)
*G02B 27/09* (2006.01)

(52) U.S. Cl.
CPC ............. *G06F 3/1446* (2013.01); *G02B 5/08* (2013.01); *G02B 27/0977* (2013.01)

(58) Field of Classification Search
CPC .......... G06F 3/011; G06F 3/017; G06F 1/163; G06F 3/0304; G06F 3/013
See application file for complete search history.

(56) References Cited

U.S. PATENT DOCUMENTS

2008/0018599 A1* 1/2008 Chang ................. G06F 3/03542 345/158
2013/0187943 A1* 7/2013 Bohn ..................... G02B 27/64 345/619
2015/0054917 A1* 2/2015 Coon ...................... G06F 21/36 348/46
2016/0063235 A1* 3/2016 Tussy ................. G06Q 20/3276 726/6
2023/0131399 A1* 4/2023 Meng ...................... G06F 3/012 715/728

* cited by examiner

*Primary Examiner* — Van N Chow
(74) *Attorney, Agent, or Firm* — Hanley, Flight & Zimmerman, LLC

(57) ABSTRACT

Methods, apparatus, systems, and articles of manufacture are disclosed to map multi-display positions. An example apparatus includes processor circuitry to cause a first display to present a first image, cause a second display to present a second image, detect a first reflection based on the first image, detect a second reflection based on the second image, and determine a position of the first display relative to the second display based on the first reflection and the second reflection.

16 Claims, 9 Drawing Sheets

METHODS AND APPARATUS TO MAP MULTI-DISPLAY POSITIONS

FIELD OF THE DISCLOSURE

This disclosure relates generally to multiple displays for electronic devices and, more particularly, to methods and apparatus to map multi-display positions.

BACKGROUND

Multiple displays can be coupled to an electronic device. Users typically inform the electronic device as to the positioning of the multiple displays relative to each other.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
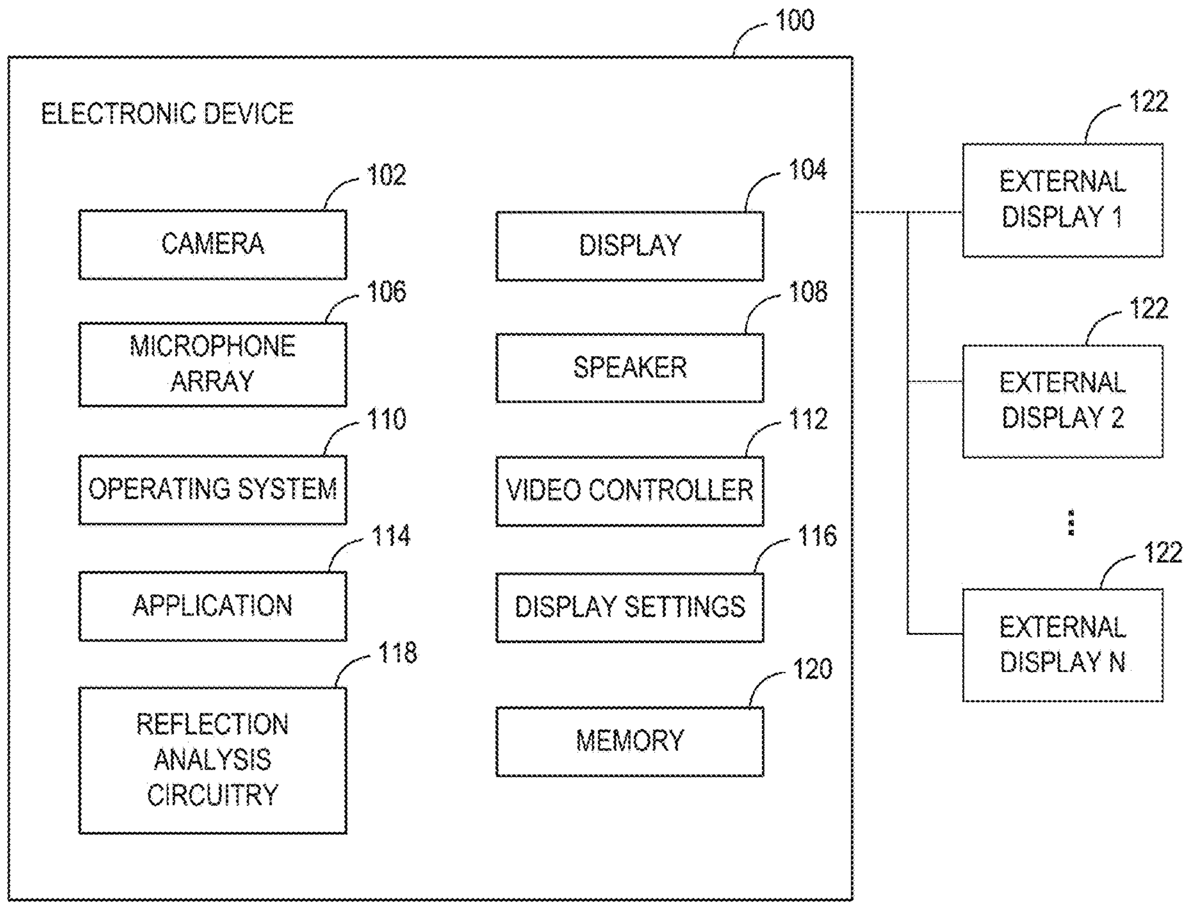
FIG. 1 is a block diagram of an example system to map multi-display positions.

Typically, when a user of an electronic device such as, for example, a laptop personal computer (PC), connect to one or more external displays, the user opens the settings applications and instructs the operating system of the electronic device as to which side of the display of the electronic the external display is positioned. That is, the user instructs the operating system as to the relative positioning of the display of the electronic device and the external display. This is repeated for multiple external displays. This task is becoming more commonly needed as business users have hybrid desks (shared desks where users do not sit every day) where the users connect their PCs to one or more external displays. Also, some products enable shared wireless screens where smartphones, tablets, watches, and/or other devices project onto television and/or computer screens in cross-screen scenarios and the connection and positions of the different screens are to be mapped.

The example multi-display position mapping methods, apparatus, systems, and articles of manufacture disclosed herein automatically map the position of a display of an electronic device relative to one or more external displays. The examples disclosed herein detect light reflection or sound to determine the relative position of displays. For example, in some examples, the system acquires reflection of a light off a user's eyes, glasses, and/or skin. The reflections are used to determine on which side of the user the display that presented the light that was reflected is positioned. Thus, in examples disclosed herein, a user is not required to tell the PC or other electronic device where the other external devices are positioned. With the automatic mapping of the relative positions of the display of the electronic device and the external display, the working area of the computer screen, extended desktop, and/or computer user interface can be subdivided and extended across all the displays to provide a clear, workable, intuitive, and cohesive presentation across the displays. Also, without requiring further user input to notify the operating system of the relative positions of the displays, connection of one or more external displays is a seamless user experience.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 is a block diagram of an example system for multiple-display position mapping. The example system includes an example electronic device 100. The electronic device 100 may be a PC, a laptop, a tablet, a phone, a watch, and/or other types of electronic devices. The electronic device 100 includes an example camera 102, an example display 104, an example microphone array 106, an example speaker 108, an example operating system 110, an example video controller 112, an example application 114, example display settings 116, example reflection analysis circuitry 118, and example memory 120. The example system also includes one or more external displays 122. In some examples, the external display is a monitor, a television, a head mounted display, and/or another PC, laptop, tablet, phone, watch, etc. Also, in some examples, the display 104 also may be a display that is external to the electronic device 100. In addition, in some examples, the camera 102, the microphone array 106, and/or the speaker 108 may be devices that are external to the electronic device 100.

In some examples, a user connects one of the external displays 122 to the electronic device 100. For example, the user may make a wired connection between the external display 122 and the electronic device 100. In some examples, the user makes a wireless connection between the external display 122 and to the electronic device 100. For example, the user may place a wireless external display 122 next to the electronic device 100. The operating system 110 may run the application 114 in the background to detect nearby displays and monitor for new display connections. In some examples, a message appears on the display 104 of the electronic device 100 to verify if the user would like to the connect to the external display 122. If the user accepts, the application 114 will detect the acceptance and then proceed with mapping the relative positions of the displays 104, 122 as disclosed herein.

In some examples, when one of the external displays 122 is coupled to the electronic device 100, the video controller 112 notifies the operating system 110 of extended display identification data associated with the external display 122. Extended display identification data includes metadata that describes formats and capabilities of display devices including, for example, display product type, manufacture information, filter type, display resolution, size, pixel mapping, timing descriptions, etc. The extended display identification data is used by the operating system 110 when formatting a portion of the working area of the computer screen, desktop, and/or computer user interface that is extended to the external display 122. The extended display identification data may be stored in the memory 120.

After the user has accepted the coupling of the external display 122, the video controller 112 detects connection to the external display 122 and, in some examples, sends a message to the application 114 to map the relative position of the display 104 and the external display 122. To map the relative position of the display 104 and the external display 122, the application 114 causes light to be displayed on the display 104 and the external display 122. In some examples, the light is an image, a color, a pattern, a flashing pattern, and/or some combinations thereamong. In some examples, the light presented on the display 104 is different than the light presented on the external display 122. For example, a red circle could be shown on one display while a green square is shown on another. In some examples, the light is presented on the display 104 and the external display 122 simultaneously. In some examples, the light is presented on the display 104 and the external display 122 in sequence. In some examples, the sequence is repetitive. In some examples, the light presented on one or more of the display 104 and/or the external display 122 is not perceivable by a person. In such examples, the invisible light may be, for example, infrared light and/or ultraviolet light. In some examples, light is only presented on the external display 122.

Figure 2A:
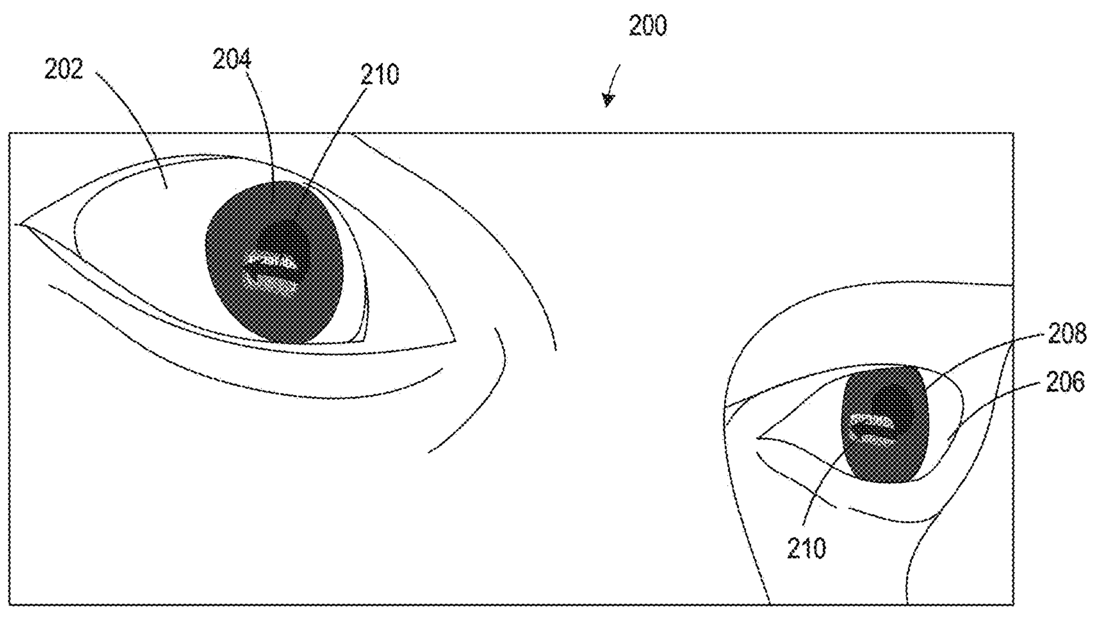
FIG. 2A is a schematic illustration of example reflection from a user's eyes.
Figure 2B:
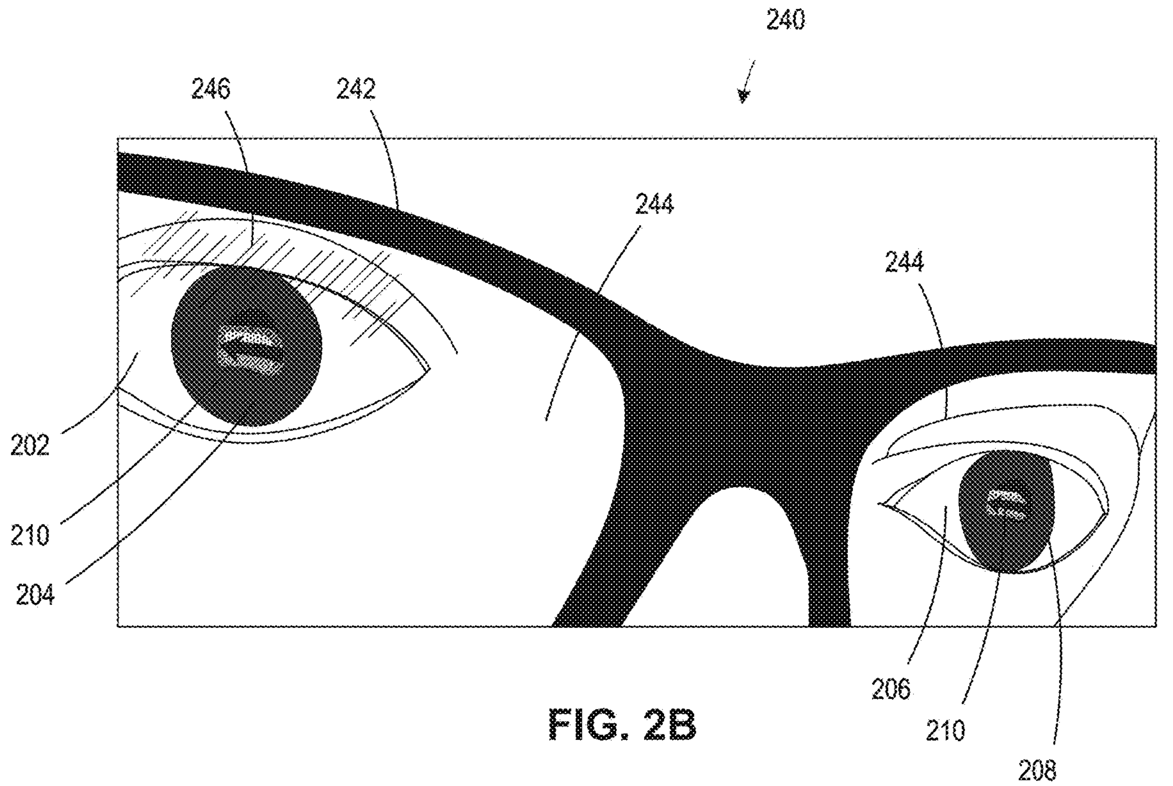
FIG. 2B is a schematic illustration of example reflection from a user's glasses.
Figure 2C:
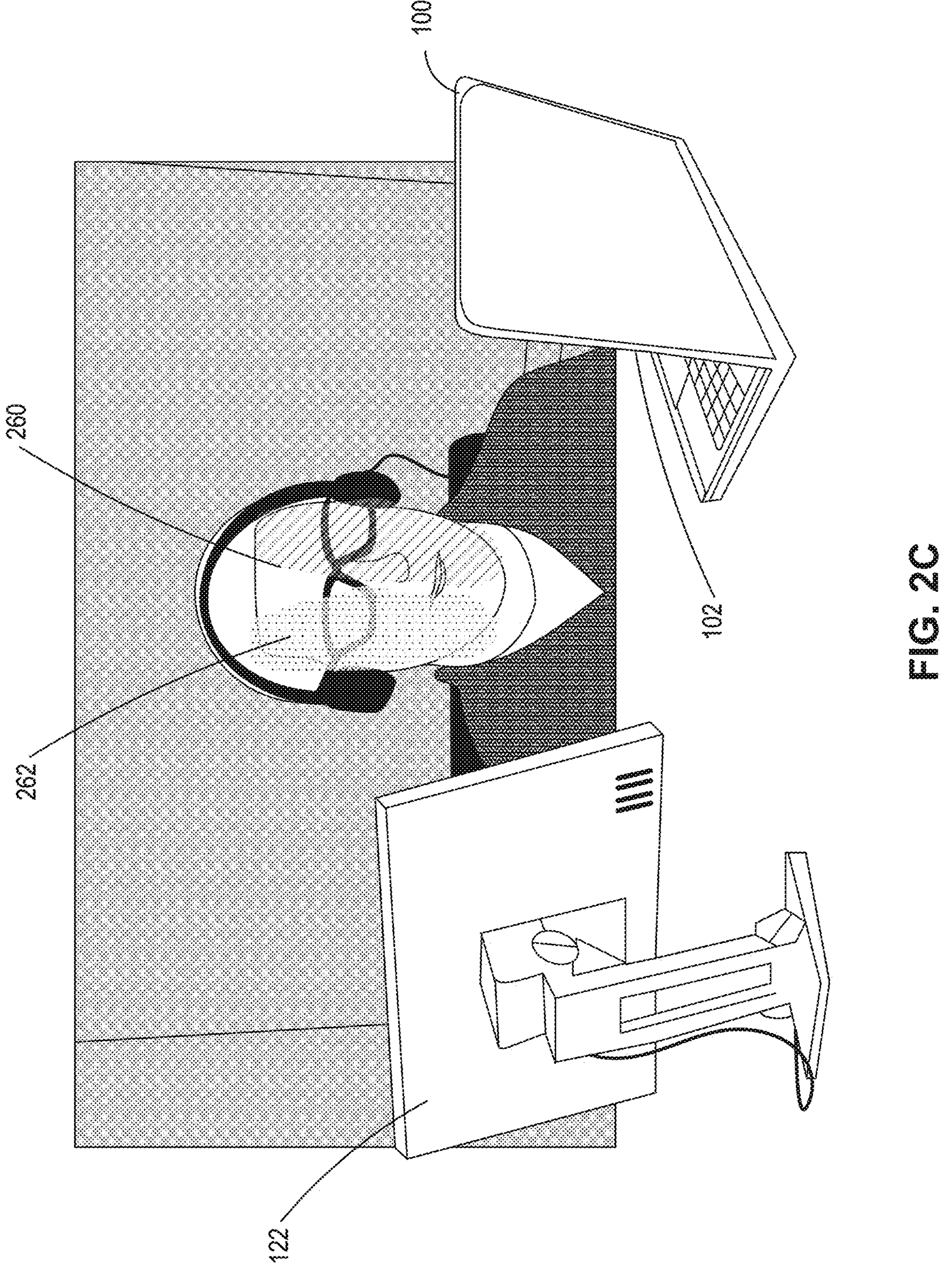
FIG. 2C is a schematic illustration of example reflection from a user's skin.

The camera 102 captures images when the light is displayed on the display 104 and/or the external display 122. The images from the camera 102 include the user positioned in front of the electronic device 100 and the external device 122. Example images or portions of images are shown in FIGS. 2A-2C. The images include a reflection of the light displayed on the display 104 and/or the external display 122. For example, FIG. 2A shows an image 200 captured by the camera 102. The image 200 includes a right eye 202 of the user with a right iris 204 (on the left side of FIG. 2A) and a left eye 206 of the user with a left iris 208 (on the right side of FIG. 2A). A reflection 210 of light is shown in both irises 204, 208.

The application 114 activates the reflection analysis circuitry 118. The reflection analysis circuitry 118 access, receives, obtains, and/or otherwise acquires images from the camera 102. The reflection analysis circuitry 118 locates the user's eyes 202, 206 in the images 200 and detects the reflection 210 of the displayed light that are reflected in the eyes 202, 206. The reflection analysis circuitry 118 determines the angle from which the reflection 210 appears to determine which side of the user the display 104, 122 emitting the light that caused the reflection 210 is situated. For example, in FIG. 2A, the reflection 210 in the right eye 202 is a first distance from a right edge of the right iris 204 (toward the left in FIG. 2A). The reflection 210 in the left eye 206 is a second distance from a right edge of the left iris 208 (toward the left in FIG. 2A). In this example, the first distance is greater than the second distance. The reflection analysis circuitry 118 knows the position and orientation of the camera 102 in the electronic device 100 and determines the position of the display 104, 122 based on the position and/or orientation of the camera 102 and the reflection 210. Thus, in this example, the reflection analysis circuitry 118 determines that the display 104, 122 emitting the light that caused the reflection 210 is positioned to the right of the user because the display 104, 122 emitting the light that caused the reflection 210 is angled or positioned closer to the right eye 202 than the left eye 206.

In some examples, the light emitted from the display 104, 122 is an image. For example, as shown in FIG. 2A, the reflection 210 shows an image with an arrow pointing to the user's right (toward the left in FIG. 2A). In this example, the reflection analysis circuitry 118 can identify the image in the reflection 210 and the clue incorporated into the image (e.g., the arrow), and determine the position of the display 104, 122 without determining an angle of the display 104, 122 relative to the user. In some examples, the displays 104, 122 can present different colors, flashing patterns, etc. that can be detected and processed as disclosed herein.

In some examples, the reflection analysis circuitry 118 incorporates machine learning circuitry. In such examples, a machine learning could be trained on reflections with and/or without special images, colors, etc. and/or without determining an angle of the display. The training data for the machine learning model can include images of different users with disparate appearances positioned in front of display that present different styles of light disclosed herein. The reflections including relative positions of the reflections on the user's eyes, face, and/or head (e.g., by quadrant, hemisphere, etc. of the user's body part) that can be aggregated and used to train the machine learning model.

The reflection analysis circuitry 118 can repeat the light emission and position determining process for each display 104, 122. Also, in some examples, the reflection analysis circuitry 118 can determine the positions of the displays 104, 122 relative to each other based on the position of one of the displays. For example, the reflection analysis circuitry 118 can determine the position of the external display 122 (e.g., the right of the user) and then know the position of the display 104 (e.g., to the left or center) based on the known position of the camera 102.

When the reflection analysis circuitry 118 determines which sides the displays 104, 122 are positioned, the application 114 updates the settings of the operating system 110, and the operating system 110 extends the working area of the computer screen, desktop, and/or computer user interface across the displays 104, 122. The portion of the working area of the computer screen, desktop, and/or computer user interface that is displayed on each of the displays 104, 122 is based on the respective position of the display 104, 122.

FIG. 2B shows another example image 240. This example is similar to the example of FIG. 2A. However, in FIG. 2B, the user is wearing glasses 242 with lenses 244. The light from the display 104, 122 produces the reflections 210 in the eyes, as disclosed above. The light from the display 104, 122 also produces a reflection 246 on at least one of the lenses 244. In the illustration, the reflection 246 is depicted by the surface lines on the lens 242. In some examples, the reflection analysis circuitry 118 identifies the reflection 246 on the lens 244. The reflection analysis circuitry 118 can determine a relative position of the display 104, 122 emitting the light that caused the reflection 246 based on the position of the reflection 246 on one or more of the lenses 244. In the example, of FIG. 2B, the reflection analysis circuitry 118 determines that the display 104, 122 emitting the light that caused the reflection 246 is positioned to the right of the user because the reflection 246 appears on the user's right lens (to the left in FIG. 2B) and/or more prominently on the right lens than on the left lens.

FIG. 2C shows an example in which the electronic device 100 with a display 104 (directed toward the user) is positioned on the user's left (to the right in FIG. 2C), and an external display 122 is positioned on the user's right (to the left in FIG. 2C). The application 114 causes light to be presented on the display 104 and the external display 122. In this example, light is presented on the display 104 and the external display 122 simultaneously. Also, in this example, the light presented on the display 104 is a first color, and the light presented on the external display 122 is a second color, different than the first color. In other examples, as disclosed herein, the respective light presented on the displays 104, 122 can be other colors, patterns, brightness, blinking patterns, images, etc. Also, in other examples, the light presented on the display 104 and the light presented on the external display 122 may be presented at different times such as, for example, in sequence and/or partially overlapping in time.

The camera 102 captures images of the user when the light is presented on the displays 104, 122. The application 114 activates the reflection analysis circuitry 118 to access, receive, obtain, and/or otherwise acquire images from the camera 102. The reflection analysis circuitry 118 detects reflected light from the skin of the user. In this example, the first color presented on the display 104 creates a first reflection 260 illustrated in FIG. 2C by straight surface lines on the user's face. The second color presented on the external display 122 creates second reflection 262 illustrated in FIG. 2C by dots on the user's face. In this example, the first reflection 260 and the second reflection 262 correspond to the different colors respectively presented on the displays 104, 122. Based on what side of the user's face the reflection 260, 262 appears, the reflection analysis circuitry 118 can determine the relative position of the display 104 and the external display 122. For example, because the reflection 260 corresponds to the color of light presented on the display 104 and the reflection 260 appears on the left side of the user's face (to the right in FIG. 2C), the reflection analysis circuitry 118 determines that the display 104 is positioned on the user's left. Similarly, because the reflection 262 corresponds to the color of light presented on the external display 122 and the reflection 262 appears on the right side of the user's face (to the left in FIG. 2C), the reflection analysis circuitry 118 determines that the display 104 is positioned on the user's right. In some examples, the brightness and/or intensity of color based on one or more parameters including, for example, a user's age, skin tone, facial hair, hairstyle, clothing on or around the head and/or face, etc. As noted above, with the relative position of the displays 104, 122 determined, the application 114 updates the settings of the operating system 110, and the operating system 110 extends the working area of the computer screen, desktop, and/or computer user interface across the displays 104, 122 based on the relative position of the displays 104, 122.

In some examples, there are multiple external displays 122. The external displays 122 can be positioned horizontally (e.g., left and/or right) and/or vertically (e.g., higher and/or lower) relative to the display 104. In some examples, the reflection analysis circuitry 118 determines the relative position of the multiple external displays 122 based using sequences of light, assessing different quadrants or hemispheres of a user's eyes, glasses, face, and/or head where reflections appear and/or via other techniques disclosed herein. In some examples, a first portion of the working area of the computer screen, desktop, and/or computer user interface is presented on the display 104, and a second portion of the working area of the computer screen, desktop, and/or computer user interface is presented on the external display 122. The first and second portion are based on the respective positions of the display 104 and the external display 122. When an additional external display 122 is detected and added, one or more of the first portion and the second portion of the working area of the computer screen, desktop, and/or computer user interface that is presented on the respective display 104 and/or display 122 is adjusted, and a third portion of the working area of the computer screen, desktop, and/or computer user interface is presented on the additional external display.

In examples, non-screen objects, such as for example, audio headsets, could be detected based in the reflections. For example, color reflection from non-screen objects could help verify proximity and/or position of those objects.

In some examples, the reflections can be used to authenticate a user and/or verify liveness of the user. Thus, in some examples, the reflections may be used as biometric authentications.

In some examples, sound may be used in addition to light to determine the relative position of the displays 104, 122. For example, after the user has accepted the coupling of the external display 122, the video controller 112 detects connection to the external display 122 and, in some examples, sends a message to the application 114 to map the relative position of the display 104 and the external display 122. To map the relative position of the display 104 and the external display 122, the application 114 causes a sound to be emitted from the speaker 108 of the electronic device 100 and/or of a speaker of the external display 122. In some examples, the sound is a tone, a series of tones, a sound inaudible to humans, other types of sounds, and/or some combinations thereamong. In some examples, the sound emitted by the speaker 108 is different than the sound emitted by the external display 122. In some examples, the sound is emitted by the speaker and the external display 122 simultaneously. In some examples, the sound is emitted by the speaker 108 and the external display 122 in sequence. In some examples, the sequence is repetitive. In some examples, sound is only emitted by the external display 122.

The microphone array 106 collects the sound emitted by the speaker 108 and/or the external display 122. The microphone array 106 includes a number of microphones operating together. The application 114 activates the reflection analysis circuitry 118 to analyze the collected to sound to determine the relative position of the external display 122 to the electronic device 100. Based on the time of arrival of the collected sounds from the different microphones in the microphone array, the reflection analysis circuitry 118 determines the relative position of the external display 122 to the electronic device 100. In some examples, the microphone array 106 on the electronic device 100 or a microphone array on the external display 122 enables directionality of the emitted sounds to be determined. In some examples, the sound direction is used to validate the direction determination enabled by light reflection. If the sound direction determination were to conflict with the light reflection-enabled direction determination, the reflection analysis circuitry 118 could repeat the process with additional imagery to confirm estimated direction of the external display 122, relative to the electronic device 100.

FIG. 1 is a block diagram of the electronic device 100 to map multi-display positions. The reflection analysis circuitry 118 of FIG. 1 may be instantiated (e.g., creating an instance of, bring into being for any length of time, materialize, implement, etc.) by processor circuitry such as a central processing unit executing instructions. Additionally or alternatively, the reflection analysis circuitry 118 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

Figure 3A:
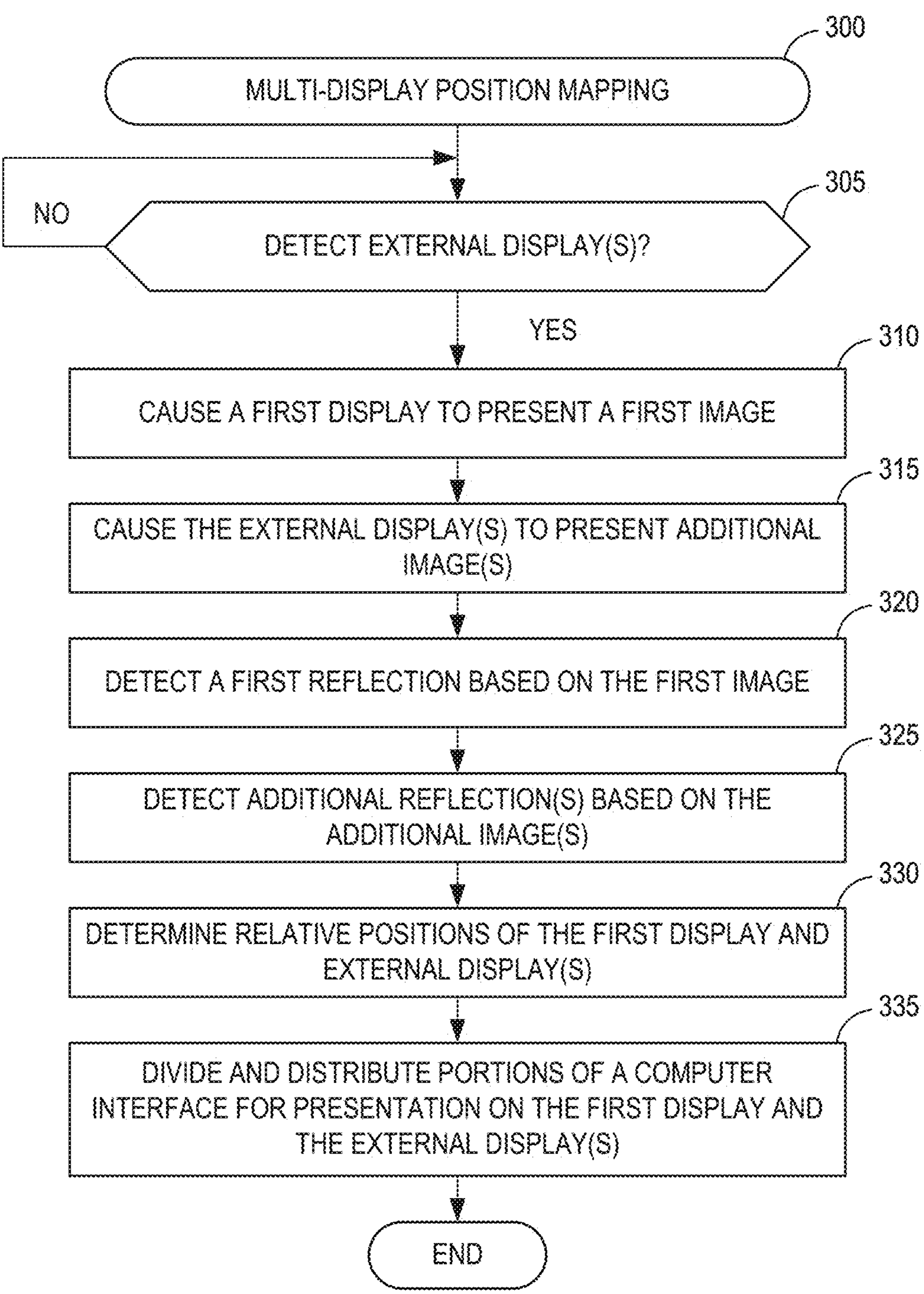
FIGS. 3A-3B are flowcharts representative of example machine readable instructions and/or example operations that may be executed by example processor circuitry to implement the example electronic device of FIG. 1.

In some examples, the reflection analysis circuitry 118 is instantiated by processor circuitry executing reflection analysis instructions and/or operations such as those represented by the flowcharts of FIGS. 3A and/or 3B.

In some examples, the apparatus includes means for determining a position of a display. For example, the means for determining may be implemented by reflection analysis circuitry 118. In some examples, the reflection analysis circuitry 118 may be instantiated by processor circuitry such as the example processor circuitry 412 of FIG. 4. For instance, the reflection analysis circuitry 118 may be instantiated by the example microprocessor 500 of FIG. 5 executing machine executable instructions such as those implemented by one or more of the operations of FIG. 3A and/or FIG. 3B. In some examples, the reflection analysis circuitry 118 may be instantiated by hardware logic circuitry, which may be implemented by an ASIC, XPU, or the FPGA circuitry 600 of FIG. 6 structured to perform operations corresponding to the machine readable instructions. Additionally or alternatively, the reflection analysis circuitry 118 may be instantiated by any other combination of hardware, software, and/or firmware. For example, the reflection analysis circuitry 118 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the electronic device 100 is illustrated in FIG. 1, one or more of the elements, processes, and/or devices illustrated in FIG. 1 may be combined, divided, re-arranged, omitted, eliminated, and/or implemented in any other way. Further, the example operating system 110, the example video controller 112, the example application 114, the example reflection analysis circuitry, and/or the example memory 120 of FIG. 1, may be implemented by hardware alone or by hardware in combination with software and/or firmware. Thus, for example, any of the example operating system 110, the example video controller 112, the example application 114, the example reflection analysis circuitry, and/or the example memory 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example electronic device 100 of FIG. 1 may include one or more elements, processes, and/or devices in addition to, or instead of, those illustrated in FIG. 1, and/or may include more than one of any or all of the illustrated elements, processes and devices.

Figure 3B:
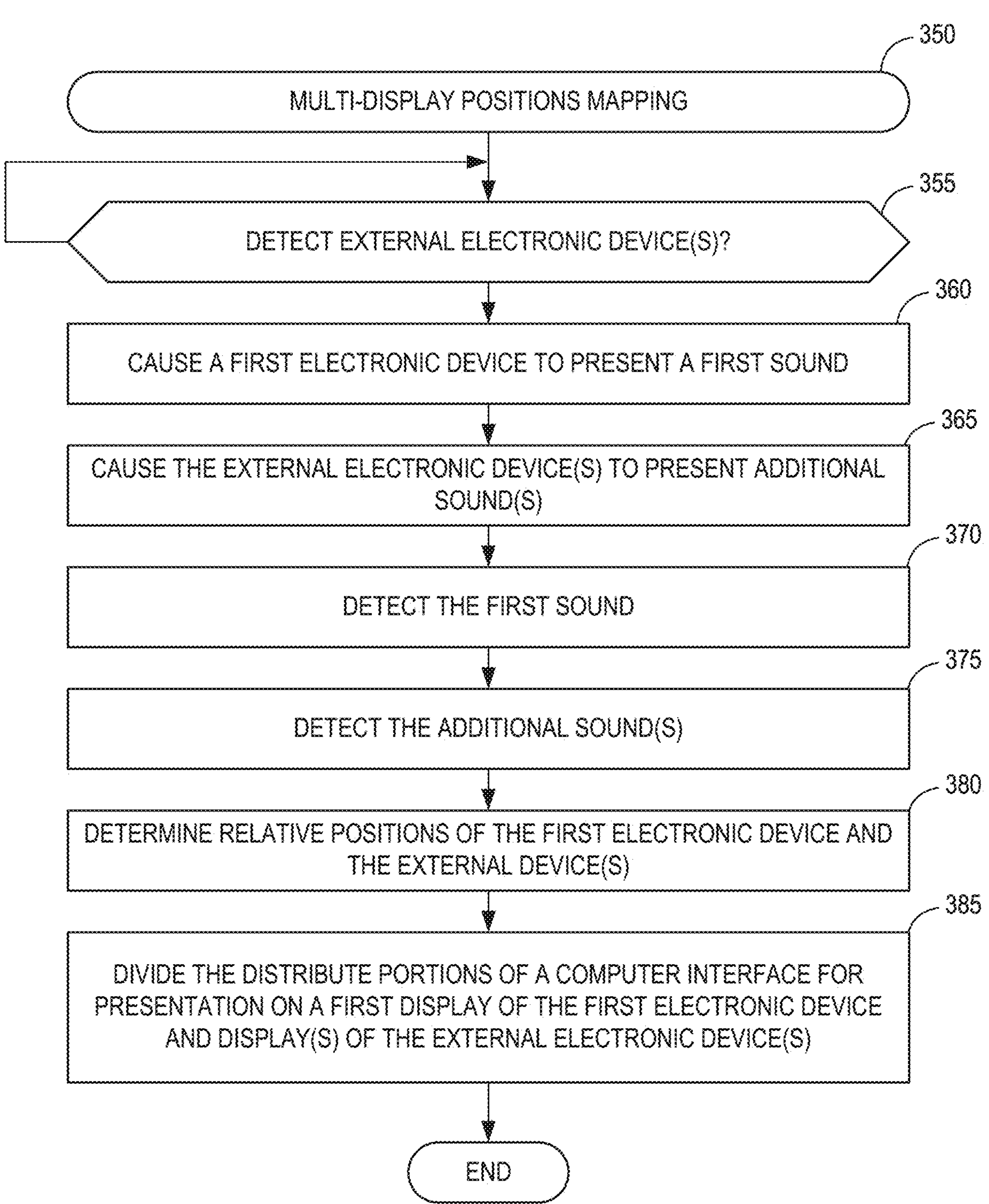

Flowcharts representative of example machine readable instructions, which may be executed to configure processor circuitry to implement the electronic device 100 of FIG. 1, are shown in FIGS. 3A and 3B. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example electronic device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3A and 3B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3A is a flowchart representative of example machine readable instructions and/or example operations 300 that may be executed and/or instantiated by processor circuitry to map multi-display positions. The machine readable instructions and/or the operations 300 of FIG. 3A include the video controller 112 determining if an external display (e.g., the external display 122) is detected via a wired connection or wirelessly (block 305). If the video controller 112 does not detect an external display (block 305: NO), the example operations 300 pause or idle until the video controller 112 detects an external display. When the video controller 112 detects an external display (block 305: YES), the application 114 causes a first display to present a first image (block 310). The image may be a light of any type disclosed herein. The application 114 also causes the external display to present an additional image (block 315). The additional image is an image different than the first image. In some examples, there are multiple external displays detected that present multiple additional images.

The reflection analysis circuitry 118 detects a first reflection based on the first image (block 320). The reflection analysis circuitry 118 also detects an additional reflection based on the second image (block 325). In some examples, the first reflection and/or the additional reflection is a reflection from a user's eyes, glasses, face, and/or head as disclosed herein.

The reflection analysis circuitry 118 determines relative positions of the first display and the external display (or multiple external displays) (block 330). For example, the reflection analysis circuitry 118 analyzes the presence and/or position of the reflections on a user's eyes, glasses, face, and/or head to identify the relative positions of the first display and the external display (or multiple external displays) is accordance with teachings disclosed herein.

The application 114 updates the operating system 110 to divide and distribute portions of a computer interface (e.g., a working area of a computer screen, an extended desktop, and/or a user interface) for presentation across the first display and the external display (or multiple external displays) (block 335). The example operations 300 then end.

FIG. 3B is a flowchart representative of example machine readable instructions and/or example operations 350 that may be executed and/or instantiated by processor circuitry to map multi-display positions. The machine readable instructions and/or the operations 350 of FIG. 3B include the video controller 112 determining if an external display (e.g., the external display 122) is detected via a wired connection or wirelessly (block 355). If the video controller 112 does not detect an external display (block 355: NO), the example operations 350 pause or idle until the video controller 112 detects an external display. When the video controller 112 detects an external display (block 355: YES), the application 114 causes a first electronic device (e.g., the speaker 108) to present a first sound (block 360). The sound may be a sound of any type disclosed herein. The application 114 also causes an external electronic device (e.g., the external display 122) to present an additional sound (block 365). The additional sound is a sound different than the first sound. In some examples, there are multiple external displays detected that present multiple additional sounds. In some examples, application 114 only causes the external devices to present sounds, and the speaker 108 of the electronic device 100 does not emit a sound.

The microphone array 106 detects a first sound (block 370). The microphone array 106 also detects the additional sounds (block 375). In some examples, the sounds are accessed by the reflection analysis circuitry 118. The reflection analysis circuitry 118 determines relative positions of the first electronic device display and the external electronic devices (or multiple external displays) (block 380). For example, the reflection analysis circuitry 118 analyzes the strength and direction of sounds.

The application 114 updates the operating system 110 to divide and distribute portions of a computer interface (e.g., a working area of a computer screen, an extended desktop, and/or a user interface) for presentation across the display 104 of the first electronic device and the external display of the external electronic device (or multiple external displays of multiple electronic devices) (block 385). The example operations 300 then end.

Figure 4:
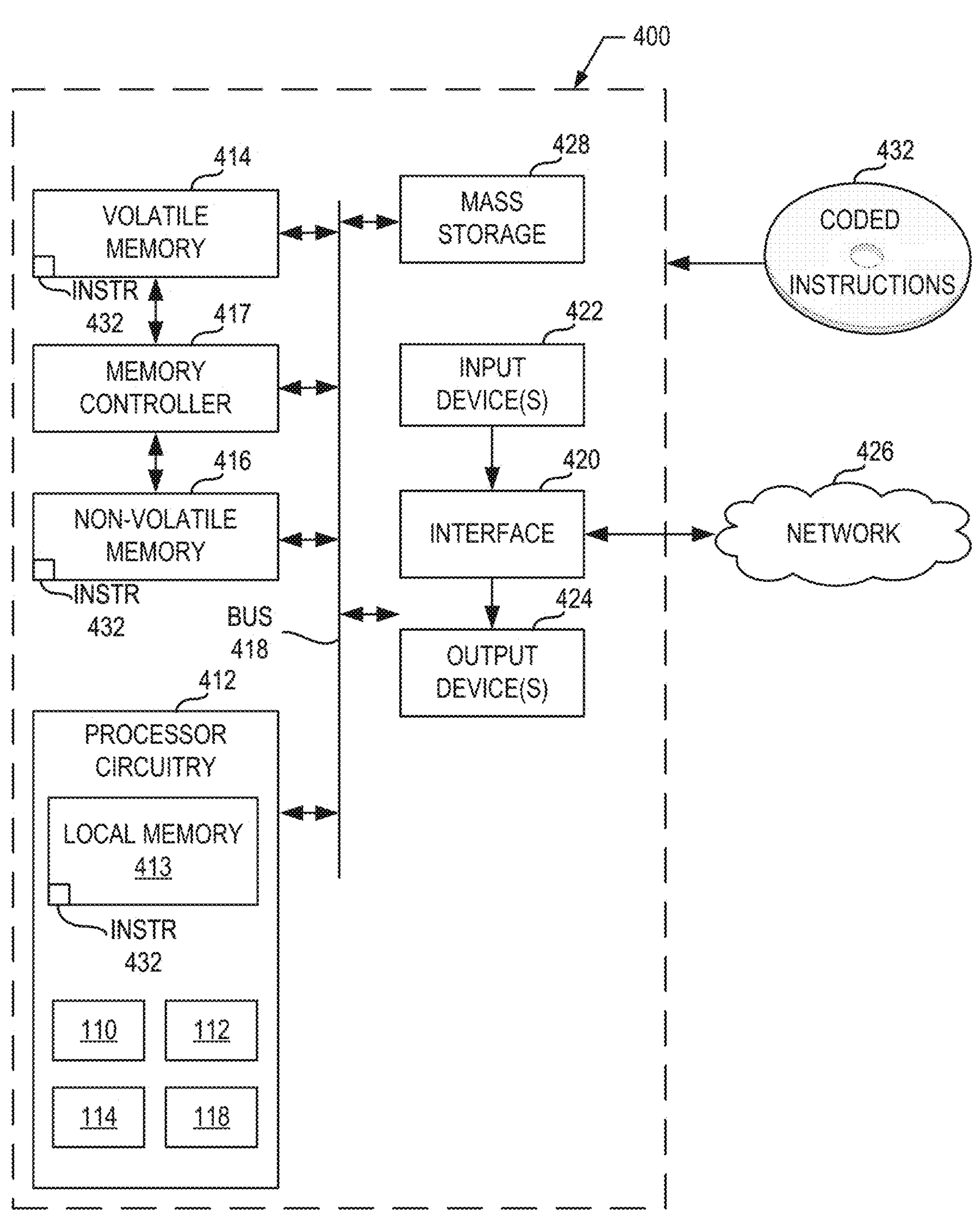
FIG. 4 is a block diagram of an example processing platform including processor circuitry structured to execute the example machine readable instructions and/or the example operations of FIGS. 3A-3B to implement the electronic device of FIG. 1.

FIG. 4 is a block diagram of an example processor platform 400 structured to execute and/or instantiate the machine readable instructions and/or the operations of FIGS. 3A and 3B to implement the electronic device 100 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs, microprocessors, CPUs, GPUs, DSPs, and/or microcontrollers from any desired family or manufacturer. The processor circuitry 412 may be implemented by one or more semiconductor based (e.g., silicon based) devices. In this example, the processor circuitry 412 implements the example operating system 110, the example video controller 112, the example application 114, and the example reflection analysis circuitry 118.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417.

The processor platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 400 of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 432, which may be implemented by the machine readable instructions of FIGS. 3A and 3B, may be stored in the mass storage device 428, in the volatile memory 414, in the non-volatile memory 416, and/or on a removable non-transitory computer readable storage medium such as a CD or DVD.

Figure 5:
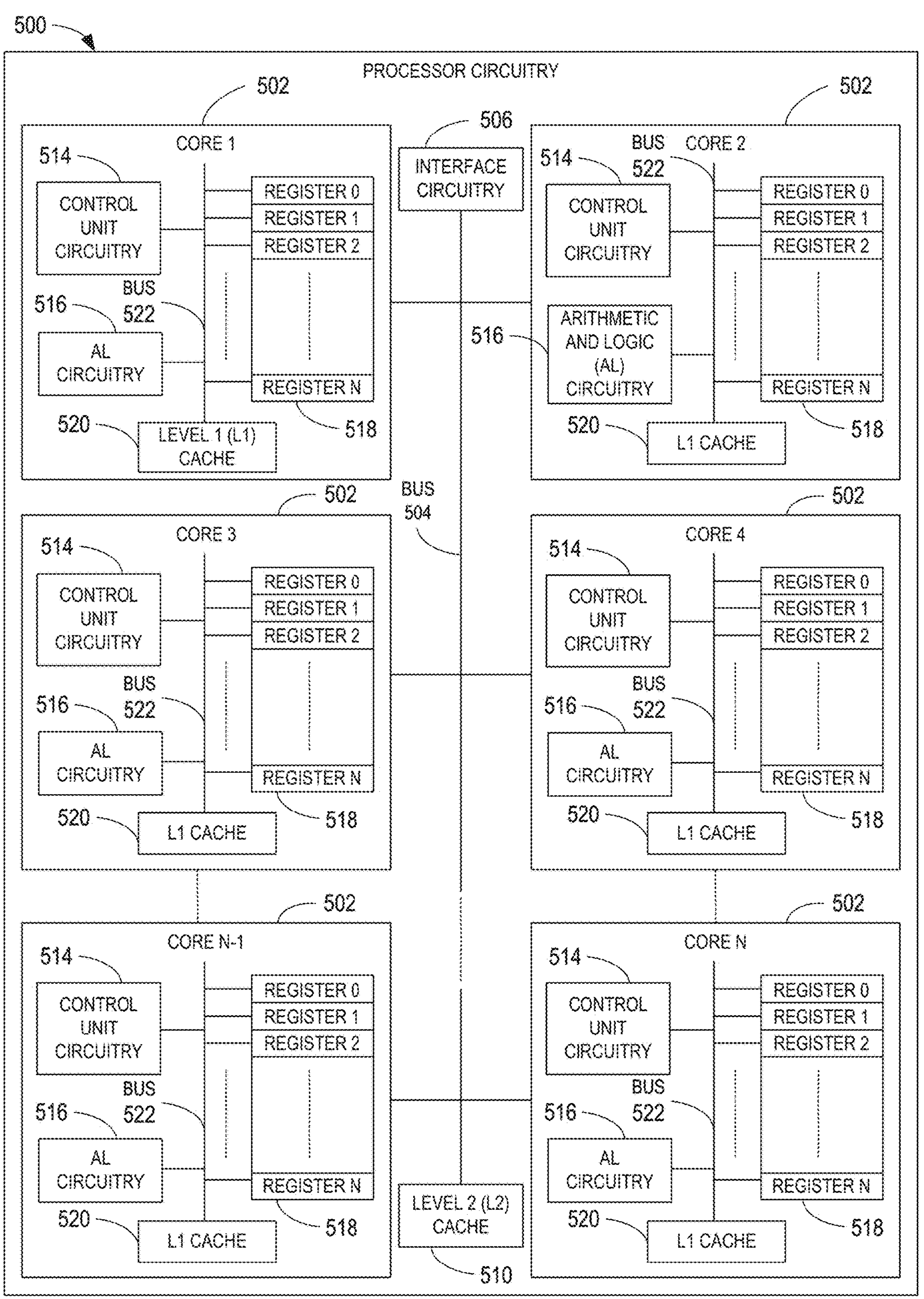
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a microprocessor 500. For example, the microprocessor 500 may be a general purpose microprocessor (e.g., general purpose microprocessor circuitry). The microprocessor 500 executes some or all of the machine readable instructions of the flowcharts of FIGS. 3A and 3B to effectively instantiate the circuitry of FIG. 1 as logic circuits to perform the operations corresponding to those machine readable instructions. In some such examples, the circuitry of FIG. 1 is instantiated by the harp ware circuits of the microprocessor 500 in combination with the instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowcharts of FIGS. 3A and 3B.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s), SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The second bus 522 may be implemented by at least one of an I2C bus, a SPI bus, a PCI bus, or a PCIe bus Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
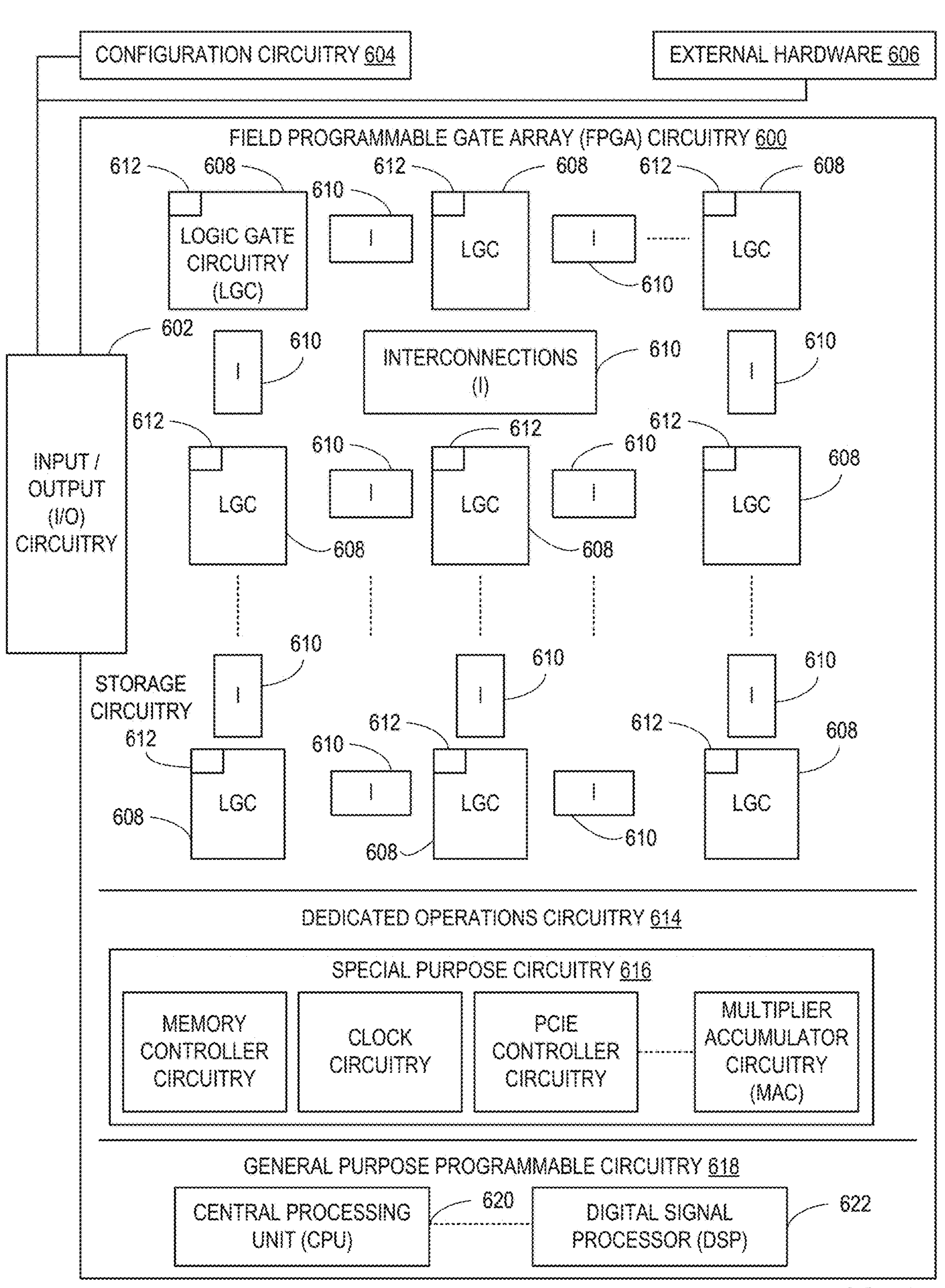
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowcharts of FIGS. 3A and 3B but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowcharts of FIGS. 3A and 3B. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowcharts of FIGS. 3A and 3B. As such, the FPGA circuitry 600 may be structured to effectively instantiate some or all of the machine readable instructions of the flowcharts of FIGS. 3A and 3B as dedicated logic circuits to perform the operations corresponding to those software instructions in a dedicated manner analogous to an ASIC. Therefore, the FPGA circuitry 600 may perform the operations corresponding to the some or all of the machine readable instructions of FIGS. 3A and 3B faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 606 may be implemented by external hardware circuitry. For example, the external hardware 606 may be implemented by the microprocessor 500 of FIG. 5. The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations that may correspond to at least some of the machine readable instructions of FIGS. 3A and 3B and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowcharts of FIGS. 3A and 3B may be executed by one or more of the cores 502 of FIG. 5, a second portion of the machine readable instructions represented by the flowcharts of FIGS. 3A and 3B may be executed by the FPGA circuitry 600 of FIG. 6, and/or a third portion of the machine readable instructions represented by the flowcharts of FIGS. 3A and 3B may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

Figure 7:
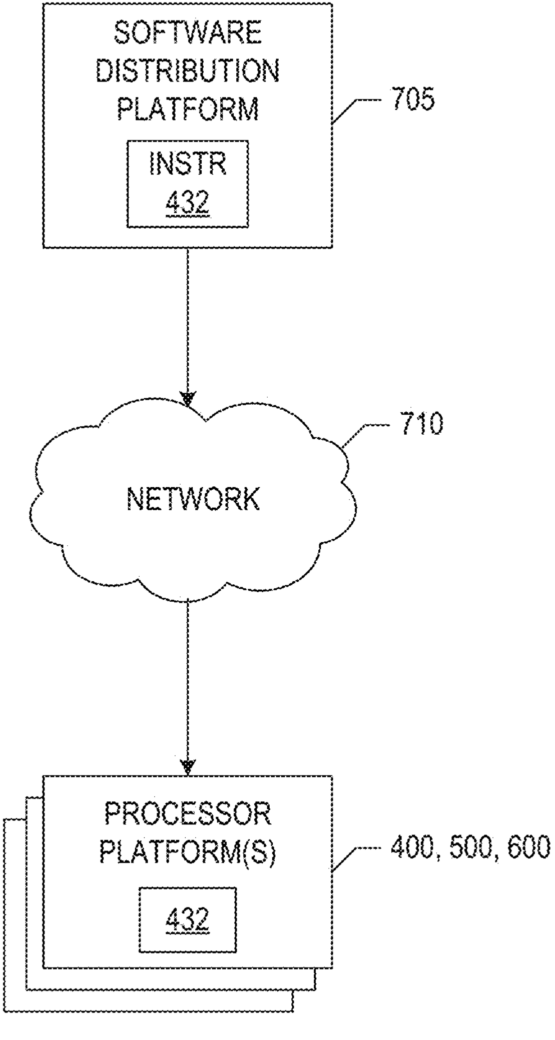
FIG. 7 is a block diagram of an example software distribution platform (e.g., one or more servers) to distribute software (e.g., software corresponding to the example machine readable instructions of FIGS. 3A-3B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 705 to distribute software such as the example machine readable instructions 432 of FIG. 4 to hardware devices owned and/or operated by third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform 705. For example, the entity that owns and/or operates the software distribution platform 705 may be a developer, a seller, and/or a licensor of software such as the example machine readable instructions 432 of FIG. 4. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the machine readable instructions 432, which may correspond to the example machine readable instructions 300, 350 of FIGS. 3A and 3B, as described above. The one or more servers of the example software distribution platform 705 are in communication with an example network 710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 432 from the software distribution platform 705. For example, the software, which may correspond to the example machine readable instructions 300, 350 of FIGS. 3A and 3B, may be downloaded to the example processor platform 400, which is to execute the machine readable instructions 432 to implement the electronic device 100. In some examples, one or more servers of the software distribution platform 705 periodically offer, transmit, and/or force updates to the software (e.g., the example machine readable instructions 432 of FIG. 4) to ensure improvements, patches, updates, etc., are distributed and applied to the software at the end user devices.

From the foregoing, it will be appreciated that example systems, methods, apparatus, and articles of manufacture have been disclosed that automatically map the position of one or more external displays. Disclosed systems, methods, apparatus, and articles of manufacture improve the efficiency of using a computing device by removing user input regarding display positioning and computer workplace, desktop, and/or user interface extension across multiple displays. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture are disclosed to map multi-display positions. Example 1 includes an apparatus that includes at least one memory, machine readable instructions, and processor circuitry to cause a first display to present a first image, cause a second display to present a second image, detect a first reflection based on the first image, detect a second reflection based on the second image, and determine a position of the first display relative to the second display based on the first reflection and the second reflection.

Example 2 includes the apparatus of Example 1, wherein the processor circuitry is to: cause the first display to present a first portion of a computer interface; and cause the second display to present a second portion of the computer interface, the first portion and the second portion selected based on the position.

Example 3 includes the apparatus of Examples 1 and/or 2, wherein at least one of the first reflection or the second reflection is reflected off an eye of a user.

Example 4 includes the apparatus of any of Examples 1-3, wherein at least one of the first reflection or the second reflection is reflected off skin of a user.

Example 5 includes the apparatus of any of Examples 1-4, wherein the first image is a first color and the second image is a second color different than the first color.

Example 6 includes the apparatus of any of Examples 1-5, wherein the first image is a first pattern of light the second image is a second pattern of light different than the first pattern.

Example 7 includes the apparatus of any of Examples 1-6, wherein at least one of the first image or the second image is invisible to a human.

Example 8 includes the apparatus of any of Examples 1-7, wherein at least one of the first image or the second image is ultraviolet light or infrared light.

Example 9 includes the apparatus of any of Examples 1-8, wherein the first image and the second image are presented in sequence.

Example 10 includes the apparatus of any of Examples 1-9, wherein the position is a first position, and the processor circuitry is to cause a third display to present a third image, detect a third reflection based on the third image, and determine a second position of the third display relative to at least one of the first display or the second display.

Example 11 includes the apparatus of Example 10, wherein the processor circuitry is to cause the third display to present a third portion of the computer interface based on the second position.

Example 12 includes the apparatus of any of Examples 1-11, wherein the processor circuitry is to determine an angle of at least one of the first reflection or the second reflection and determine the position based on the angle.

Example 13 includes the apparatus of any of Examples 1-12, wherein the processor circuitry is to detect an object based on at least one of the first reflection or the second reflection.

Example 14 includes a non-transitory machine readable storage medium comprising instructions that, when executed, cause processor circuitry to at least cause a first display to present a first image, cause a second display to present a second image, and determine a position of the first display relative to the second display based on a first reflection of the first image and a second reflection of the second image.

Example 15 include the storage medium of Example 14, wherein the instructions cause the processor circuitry is to extend a first portion of a working area of a computer screen to the first display, and extend a second portion of the working area to the second display, the first portion and the second portion selected based on the position.

Example 16 includes the storage medium of Examples 14 and/or 15, wherein at least one of the first reflection or the second reflection is reflected off an eye of a user.

Example 17 includes the storage medium of any of Examples 14-16, wherein at least one of the first reflection or the second reflection is reflected off skin of a user.

Example 18 includes the storage medium of any of Examples 14-17, wherein the first image is at least one of a first color or a first pattern of light and the second image is at least one of a second color different than the first color or a second pattern of light different than the first pattern.

Example 19 includes the storage medium of any of Examples 14-18, wherein the position is a first position, and the instructions cause the processor circuitry to cause a third display to present a third image, determine a second position of the third display relative to at least one of the first display or the second display, and extend a third portion of the working area to the third display, the third portion based on the second position.

Example 20 includes an apparatus that includes at least one memory, machine readable instructions, and processor circuitry to at least one of instantiate or execute the machine readable instructions to cause a first electronic device to emit a first sound, cause a second electronic device to emit a second sound, determine a position of a first display of the first electronic device relative to a second display of the second electronic device based on the first sound and the second sound, cause the first display to present a first portion of an extended desktop, and cause the second display to present a second portion of the extended desktop, the first portion and the second portion selected based on the position.

Example 21 includes methods to use, operate, execute, or instantiate any of apparatus and/or instructions of any of Examples 1-20.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine readable instructions; and
at least one processor circuit to at least one of instantiate or execute the machine readable instructions to:
cause a first display to present a first image;
cause a second display to present a second image;
detect a first reflection based on the first image;
detect a second reflection based on the second image;
determine a first position of the first display relative to the second display based on the first reflection and the second reflection;
cause the first display to present a first portion of a computer interface;
cause the second display to present a second portion of the computer interface, the first portion and the second portion selected based on the first position;
cause a third display to present a third image;
detect a third reflection based on the third image; and
determine a second position of the third display relative to at least one of the first display or the second display.

2. The apparatus of claim 1, wherein at least one of the first reflection or the second reflection is reflected off an eye of a user.

3. The apparatus of claim 1, wherein at least one of the first reflection or the second reflection is reflected off skin of a user.

4. The apparatus of claim 1, wherein the first image is a first color and the second image is a second color different than the first color.

5. The apparatus of claim 1, wherein the first image is a first pattern of light the second image is a second pattern of light different than the first pattern.

6. The apparatus of claim 1, wherein at least one of the first image or the second image is invisible to a human.

7. The apparatus of claim 1, wherein at least one of the first image or the second image is ultraviolet light or infrared light.

8. The apparatus of claim 1, wherein the first image and the second image are presented in sequence.

9. The apparatus of claim 1, wherein one or more of the at least one processor circuit is to cause the third display to present a third portion of the computer interface based on the second position.

10. The apparatus of claim 1, wherein one or more of the at least one processor circuit is to determine an angle of at least one of the first reflection or the second reflection and determine the first position based on the angle.

11. The apparatus of claim 1, wherein one or more of the at least one processor circuit is to detect an object based on at least one of the first reflection or the second reflection.

12. A non-transitory machine readable storage medium comprising instructions that, when executed, cause processor circuitry to at least:

cause a first display to present a first image;

cause a second display to present a second image;

cause a third display to present a third image;

determine a first position of the first display relative to the second display based on a first reflection of the first image and a second reflection of the second image;

determine a second position of the third display relative to at least one of the first display or the second display based on a third reflection of the third image;

extend a first portion of a working area of a computer screen to the first display; and extend a second portion of the working area to the second display, the first portion and the second portion selected based on the first position.

13. The storage medium of claim 12, wherein at least one of the first reflection or the second reflection is reflected off an eye of a user.

14. The storage medium of claim 12, wherein at least one of the first reflection or the second reflection is reflected off skin of a user.

15. The storage medium of claim 12, wherein the first image is at least one of a first color or a first pattern of light and the second image is at least one of a second color different than the first color or a second pattern of light different than the first pattern.

16. The storage medium of claim 12, wherein the instructions cause the processor circuitry to extend a third portion of the working area to the third display, the third portion based on the second position.

* * * * *